United States Patent
Kim

[11] Patent Number: 5,929,926
[45] Date of Patent: Jul. 27, 1999

[54] AUTOMATIC ASPECT RATIO SWITCHING APPARATUS

[75] Inventor: Jin-bog Kim, Suwon, Rep. of Korea

[73] Assignee: Samsung Electronics Co., Ltd., Kyungki-do, Rep. of Korea

[21] Appl. No.: 08/891,502

[22] Filed: Jul. 11, 1997

[30] Foreign Application Priority Data

Jul. 25, 1996 [KR] Rep. of Korea ...................... 96-30456

[51] Int. Cl.$^6$ ............................... H04N 3/27; H04N 5/46
[52] U.S. Cl. ............................................. 348/556; 348/558
[58] Field of Search .................................... 348/556, 558, 348/555, 581, 704; H04N 3/27, 5/46

[56] References Cited

U.S. PATENT DOCUMENTS 5,168,362  12/1992  Yoshida .

*Primary Examiner*—Sherrie Hsia
*Attorney, Agent, or Firm*—Sughrue, Mion, Zinn, Macpeak & Seas, PLLC

[57] ABSTRACT

An automatic aspect ratio switching apparatus for automatically switching an aspect ratio is provided. The apparatus includes a satellite intermediate frequency processor which demodulates the broadcast signal from an intermediate frequency signal received from the satellite. A decoder detects aspect ratio support data which is included in the satellite broadcasting signal. Based on this detected aspect ratio support data, the deflection of the electron beam in the display of the television receiver is automatically caused to correspond to the aspect ratio of the broadcast signal. Accordingly, an aspect ratio can be automatically switched according to the aspect ratio support data inserted on the broadcasting signal sent by a broadcasting station without manual operation of a key.

4 Claims, 1 Drawing Sheet

AUTOMATIC ASPECT RATIO SWITCHING APPARATUS

BACKGROUND OF THE INVENTION

The present invention relates to an apparatus for automatically switching an aspect ratio of an image. More particularly, it relates to an automatic aspect ratio switching apparatus in which an aspect ratio of a broadcasting signal, which includes an aspect ratio support data and is output from a broadcast satellite (BS), is automatically recognized and automatically switched to corresponding aspect ratio, to display the broadcasting signal with the corresponding aspect ratio on a television receiver. This application for an automatic aspect ratio switching apparatus is based on Korean Patent Application no. 96-30456 which is incorporated herein by reference for all purposes.

Satellite broadcasting is a broadcasting system in which a broadcast satellite (BS) located on a geostationary orbit an altitude of approximately 35,000 to 36,000 km above the equator receives broadcasting signals sent from a ground broadcasting station and then re-broadcasts (or "relays") the broadcasting signals back to the earth. The broadcast signals relayed by the broadcast satellite are received using a parabolic antenna at the location of each broadcast recipient (e.g., at the recipient's home). In the reception range (i.e., the "footprint") of the relayed signals there are no poor reception regions; an image signal is visible and sound signal is very clear.

The broadcast satellite business is broadcasting system wherein broadcast signals are individually received when sent from a geostationary satellite.

The satellite broadcast requires a receiver which can receive a SHF signal (about 3 to 13 GHz). The SHF signal, which is weaker than conventional VHF or UHF signals, is influenced by rain, clouds, water, or trees. Accordingly, a good antenna, converter, and receiver are required for obtaining a good image from the received SHF satellite broadcast signal. In a device for receiving the satellite broadcast, the antenna and the converter are connected together and installed outdoors and the receiver, which connects to a television receiver, is installed indoors.

The satellite broadcast sends signals for a wide image (having an aspect ratio of 16 to 9) as well as those for a normal TV image (having an aspect ratio of 4 to 3) according to the characteristics of the programs being broadcast. The wide image is in general most naturally visible. When a normal image or a wide image, according to the characteristics of the broadcasting programs, is received by the satellite broadcasting receiver, an automatic aspect ratio switching apparatus is required for automatically displaying the wide image or normal image according to the appropriate aspect ratio.

According to the conventional art, since the normal image of an analog broadcasting signal is displayed as a wide image, the images are widely displayed, and further all lines are roughly shown.

SUMMARY OF THE INVENTION

It is an object of the present invention to provide an apparatus for automatically switching an aspect ratio in which a normal image and a wide image are recognized according to aspect ratio support data included in a broadcasting signal received through a satellite communication, and further the broadcasting signal is displayed according to the received aspect ratio.

To accomplish the above object, there is provided an automatic aspect ratio switching apparatus comprising: a satellite intermediate frequency processor, a decoder, a microprocessor, and a deflection portion. The satellite intermediate frequency processor demodulates an intermediate frequency of the broadcasting signal received from the satellite. The decoder detects aspect ratio support data of a satellite broadcasting signal processed in the satellite intermediate frequency processor. The microprocessor recognizes the aspect ratio support data detected from the decoder, and outputs a control signal corresponding to the recognized aspect ratio support data. The deflection portion determines an appropriate direction of the CRT electron beam to correspond to the aspect ratio of the broadcasting signal according to the control signal output from the microprocessor, and outputs to a display.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
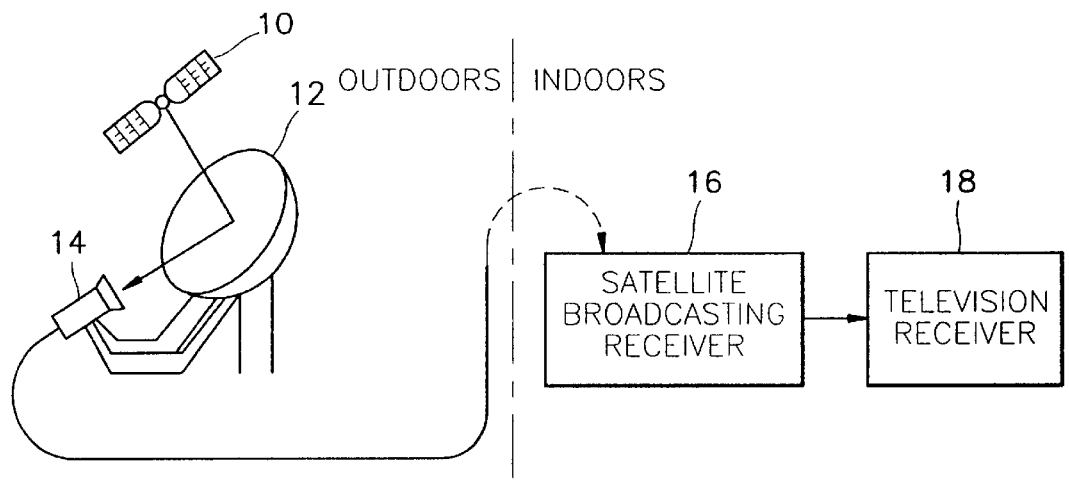
FIG. 1 shows a structure of a satellite broadcasting receiving and displaying system in which an automatic aspect ratio switching apparatus according to the present invention is adopted.

FIG. 1 shows a satellite broadcasting receiving and displaying apparatus in which an automatic aspect ratio switching apparatus according to the present invention is adopted. The system includes a satellite broadcasting antenna 12 for receiving satellite broadcasting signals sent from a broadcast satellite 10, and a satellite broadcasting converter 14 for amplifying signals received from the antenna 12 at low frequency, low noise, and a high bandwidth and outputting the amplified signal. A satellite broadcasting receiver 16 receives the output of the satellite broadcasting converter 14 through a coaxial cable to convert channels of the satellite broadcasting to intermediate frequency (IF) video signals and audio signals for forwarding to a television. The television receiver 18 displays the video signal and outputs the audio signal which is output from the satellite broadcasting receiver 16.

Figure 2:
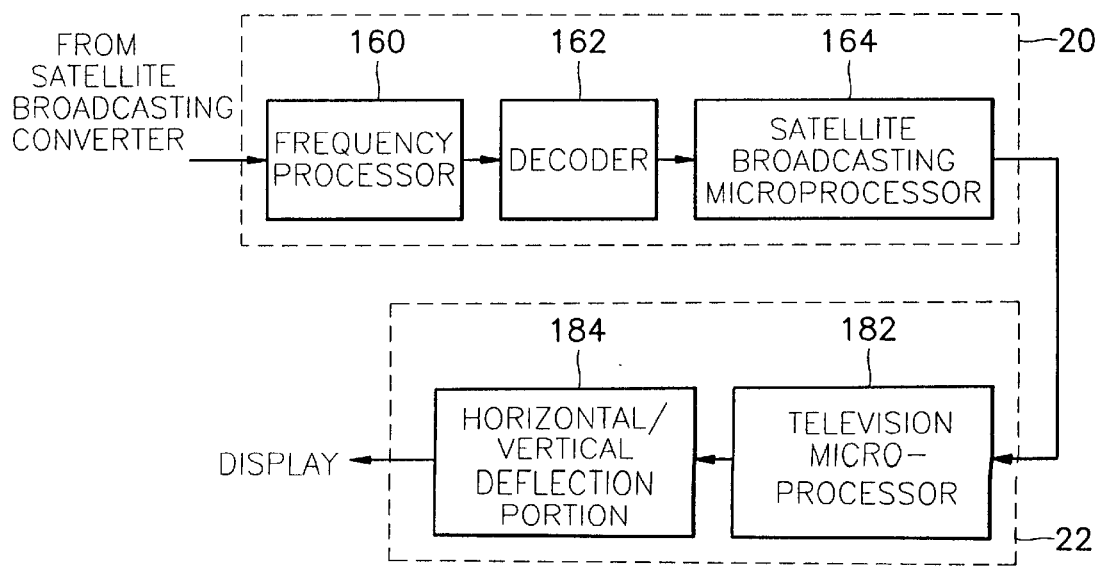
FIG. 2 shows a block diagram of an automatic aspect ratio switching apparatus according to the present invention.

Referring to FIG. 2, an aspect ratio support data detector 20 includes a satellite intermediate frequency processor 160 which demodulates the broadcasting signals from the intermediate frequency to a transport stream. Decoder 162 detects an aspect ratio support data of the satellite broadcasting signals from the transport stream demodulated in the intermediate frequency processor 160. A satellite broadcasting microprocessor 164 recognizes the aspect ratio support data detected in the decoder 162 and outputs a control signal corresponding thereto.

A display controller 22 includes a television microprocessor 182 which receives information regarding the aspect ratio from the satellite broadcasting microprocessor 164 and outputs a control signal corresponding thereto. A horizontal/vertical deflection portion 184 determines an appropriate direction of electron beam deflection in order to correspond to an aspect ratio of the received broadcasting signals based on the control signal output from the television microprocessor 182. The determination of deflection portion 184 is output to a display for controlling beam deflection.

According to a preferred embodiment, the satellite broadcasting microprocessor 164 and the television microprocessor 182 are embodied as one microprocessor, in which a deflection value is processed by recognizing a mode switching command.

Also according to the preferred embodiment, the decoder 162 performs decoding by an MPEG-II method.

Operations of devices shown in FIGS. 1 and 2 are described as follows.

Broadcasting signals sent to the satellite from a ground broadcasting station (not shown) includes a data channel for service which transports various information according to PCM audio signals. An aspect ratio support data is inserted on the data channel for service. In the decoder 162 operating consistent with the MPEG-II method, the aspect ratio support data inserted on the data channel for service is detected from the satellite broadcasting signals received through the satellite antenna 12.

When the aspect ratio support data is detected, the satellite broadcasting microprocessor 164 informs the television microprocessor 182. The television microprocessor 182 then outputs a control signal corresponding to the received aspect ratio support data.

In the deflection portion 184, deflection values are processed responding to the control signal output from the television microprocessor 182, and in the display, an image is displayed with an aspect ratio corresponding to that of the program sent by the ground broadcasting station.

According to an alternate embodiment, the aspect ratio can be selected regardless of the aspect ratio support data inserted on the broadcasting signal of the sent program.

According to the above present invention, an aspect ratio can be automatically switched according to the aspect ratio support data inserted on the broadcasting signal sent by a broadcasting station without manual operation of a key.

Although the present invention has been described in terms of a preferred embodiment, it will be appreciated that various changes and modifications may be made to the described embodiment without departing from the spirit and scope of the invention.

What is claimed is:

1. An automatic aspect ratio switching apparatus for automatically recognizing the aspect ratio of a broadcasting signal received through satellite broadcasting and switching the aspect ratio for display accordingly, the apparatus comprising:

a satellite intermediate frequency processor for demodulating the broadcasting signal received from said satellite from an intermediate frequency;

a decoder for detecting aspect ratio support data of the satellite broadcasting signal demodulated by said satellite intermediate frequency processor;

a microprocessor for recognizing the aspect ratio support data detected by said decoder and outputting a control signal corresponding thereto; and a deflection portion for determining a direction of an electron beam to correspond to the aspect ratio of the broadcasting signal according to the control signal output from said microprocessor and outputting a deflection signal to a display corresponding to the determined direction.

2. The apparatus according to claim 1, wherein said decoder performs decoding consistent with an MPEG-II standard to detect the aspect ratio support data.

3. An automatic aspect ratio switching apparatus for automatically recognizing the aspect ratio of a broadcasting signal received through satellite broadcasting and switching the aspect ratio for display accordingly, the apparatus comprising:

a satellite intermediate frequency processor receiving the broadcasting signal from said satellite and demodulating it from an intermediate frequency;

a decoder receiving as an input the satellite broadcasting signal demodulated by said satellite intermediate frequency processor and producing as an output a detected aspect ratio support data decoded from the demodulated satellite broadcasting signal;

a microprocessor which receives the aspect ratio support data detected by said decoder and outputs a control signal corresponding to the detected aspect ratio support data; and a deflection portion receiving said control signal as an input and outputting, to a display, a deflection signal for determining a direction of an electron beam in said display to correspond to an aspect ratio of the broadcasting signal according to the control signal output from said microprocessor.

4. The apparatus according to claim 3, wherein said decoder performs decoding consistent with an MPEG-II standard to detect the aspect ratio support data.

* * * * *